(12) United States Patent
Grip

(10) Patent No.: US 9,547,208 B2
(45) Date of Patent: Jan. 17, 2017

(54) DIVIDED BACKLIGHT CONFIGURATION OF A DISPLAY

(71) Applicant: Sony Mobile Communications Inc., Tokyo (JP)

(72) Inventor: Martin Grip, Hollviken (SE)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 2 days.

(21) Appl. No.: 14/696,786

(22) Filed: Apr. 27, 2015

(65) Prior Publication Data

US 2016/0313593 A1 Oct. 27, 2016

(51) Int. Cl.
*G02F 1/1335* (2006.01)
*G02F 1/1345* (2006.01)
*G02F 1/1333* (2006.01)
*F21V 8/00* (2006.01)

(52) U.S. Cl.
CPC .......... *G02F 1/13452* (2013.01); *G02B 6/009* (2013.01); *G02B 6/0073* (2013.01); *G02F 1/1336* (2013.01); *G02F 1/13338* (2013.01); *G02F 1/133514* (2013.01)

(58) Field of Classification Search
CPC G02F 1/13452; G02F 1/13338; G02F 1/1336; G02F 1/133514; G09G 3/20; G02B 6/009; G02B 6/0073
See application file for complete search history.

(56) References Cited

U.S. PATENT DOCUMENTS

| 5,553,299 A | * | 9/1996 | McPherson | .......... H04B 1/3816 340/815.41 |
|---|---|---|---|---|
| 2004/0090584 A1 | * | 5/2004 | Mai | ..................... G02F 1/13452 349/149 |
| 2005/0179850 A1 | * | 8/2005 | Du | .................... G02F 1/133615 349/150 |
| 2008/0111950 A1 | * | 5/2008 | Hong | ................... G02B 6/0085 349/65 |
| 2010/0134743 A1 | * | 6/2010 | Shin | ......................... G02F 1/13 349/143 |

OTHER PUBLICATIONS

International Search Report and Written Opinion from counterpart International Patent Application No. PCT/US2015/057654, mailed Jan. 22, 2016.

* cited by examiner

*Primary Examiner* — Nathanael R Briggs
(74) *Attorney, Agent, or Firm* — Tucker Ellis LLP

(57) ABSTRACT

A device may comprise a display panel; a backlight; a printed circuit board, wherein the backlight is between the display panel and the printed circuit board; one or more lights, wherein the one or more light sources are directly connected to the printed circuit board, and one or more light coupling units, wherein each light coupling unit is configured to guide light, when emitted by a corresponding light source of the one or more light sources, to the backlight, and wherein the backlight guides the light towards the display panel.

20 Claims, 16 Drawing Sheets

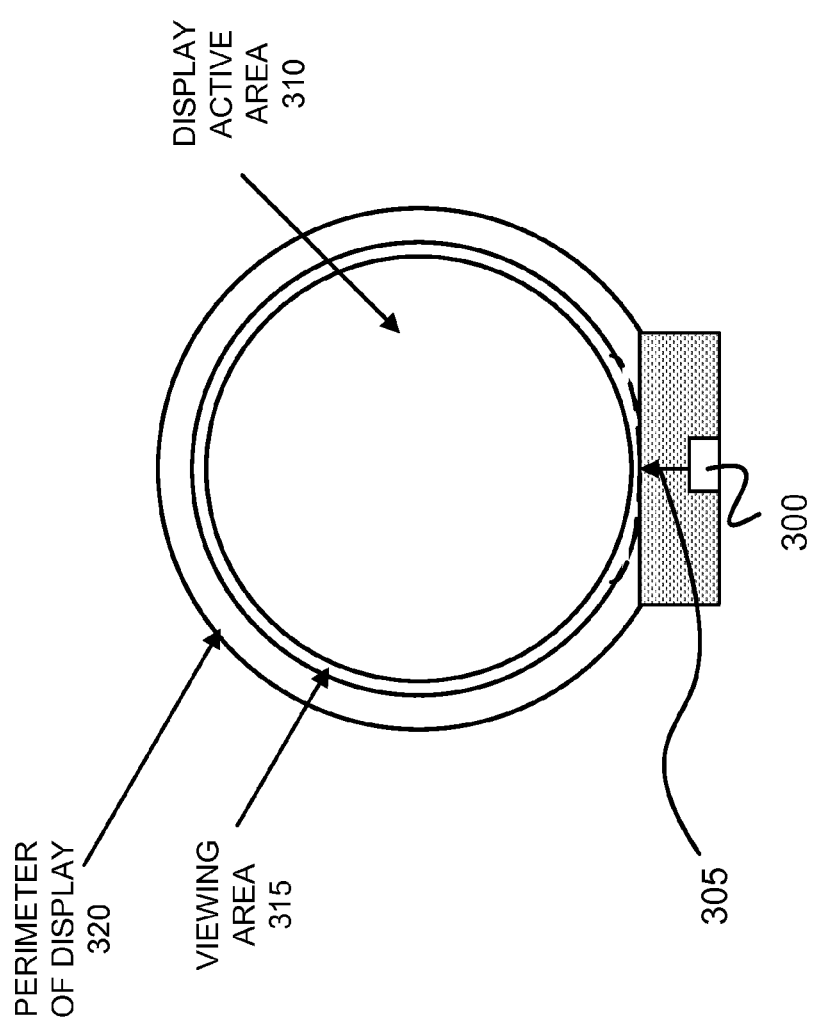

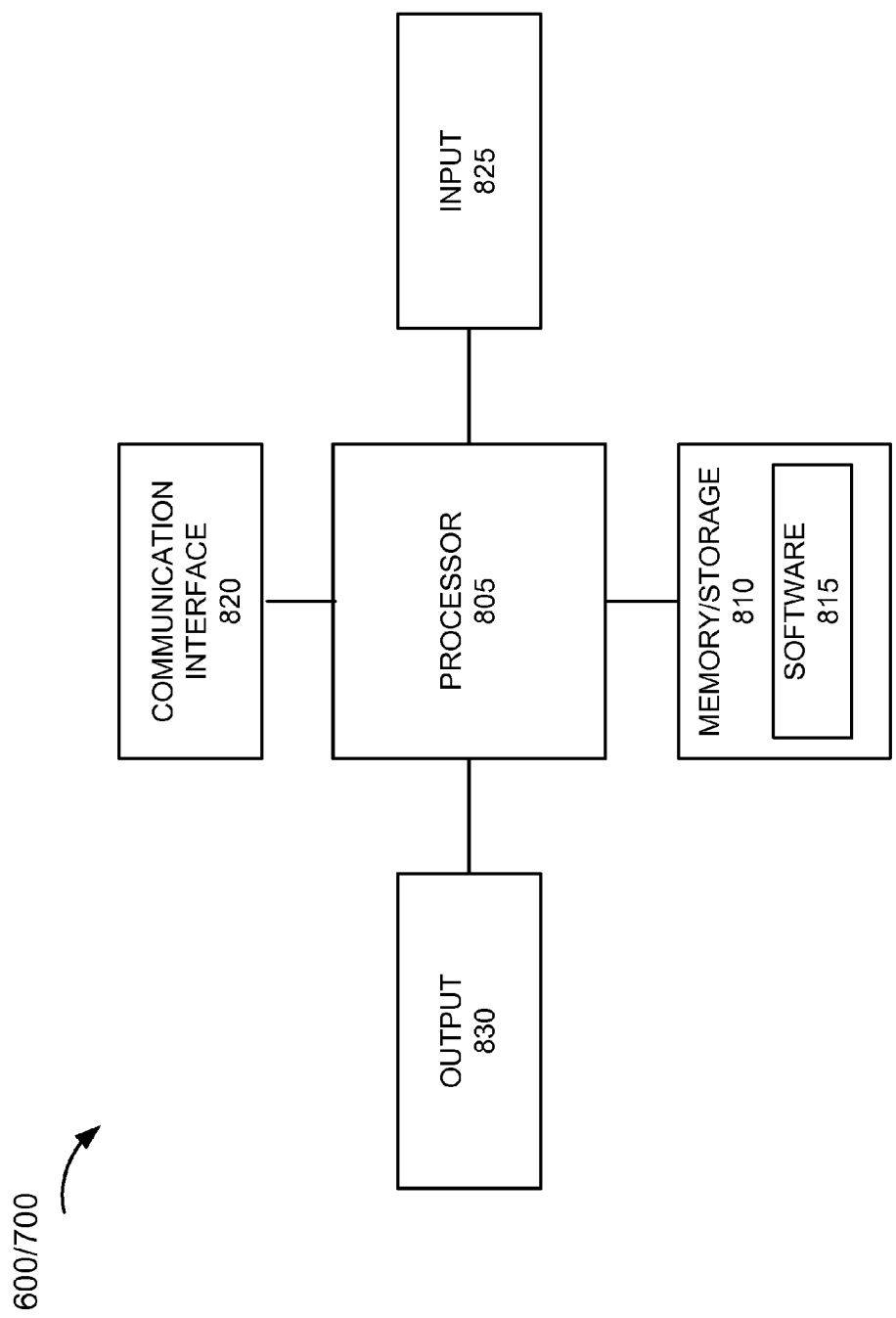

DIVIDED BACKLIGHT CONFIGURATION OF A DISPLAY

BACKGROUND

A device, such as a mobile device or a wearable device, offers various services to its user. Users may interact with the displays of these devices via touch panels and/or touchless panels. While touch and touchless input technologies allow users a great deal of flexibility when operating these devices, designers and manufacturers are continually striving to improve the qualities of such displays, as well as displays that do not have input capabilities.

SUMMARY

According to one aspect, a display may comprise a display panel, wherein the display panel comprises two or more bonding areas; a driver configured to drive the display panel; a layer that provides a medium via which signals can propagate to and from the driver, and wherein the driver is mounted to the layer; two or more flexible connectors, wherein the two or more flexible connectors provide communication paths between the display panel and the driver, and wherein a first end of each of the two or more flexible connectors connects to the display panel at a corresponding one of the two or more bonding areas, and wherein a second end of each of the two or more flexible connectors connects to the driver via the layer; and a backlight, wherein the backlight is located between the display panel and the layer. The display may further comprise one or more light sources; one or more light coupling units, wherein each light coupling unit is configured to guide light, when emitted by a corresponding light source of the one or more light sources, to the backlight; and a printed circuit board, wherein the one or more light sources are directly connected to the printed circuit board, and the layer and the backlight are between the printed circuit board and the display panel.

According to another aspect, a user device may comprise a display comprising: a display panel, wherein the display panel comprises two or more bonding areas; a driver configured to drive the display panel; a layer that provides a medium via which signals can propagate to and from the driver, and wherein the driver is mounted to the layer; two or more flexible connectors, wherein the two or more flexible connectors provide communication paths between the display panel and the driver, and wherein a first end of each of the two or more flexible connectors connects to the display panel at a corresponding one of the two or more bonding areas, and wherein a second end of each of the two or more flexible connectors connects to the driver via the layer; and a backlight, wherein the backlight is located between the display panel and the layer. The user device may further comprise one or more light sources; one or more light coupling units, wherein each light coupling unit is configured to guide light, when emitted by a corresponding light source of the one or more light sources, to the backlight; a printed circuit board, wherein the one or more light sources are directly connected to the printed circuit board, and the layer and the backlight are between the printed circuit board and the display panel; and a memory, wherein the memory stores software; and a processor, wherein the processor is configured to execute the software.

According to yet another aspect, a display may comprise a display panel; a backlight; a printed circuit board, wherein the backlight is between the display panel and the printed circuit board; one or more light sources, wherein the one or more light sources are directly connected to the printed circuit board; and one or more light coupling units, wherein each light coupling unit is configured to guide light, when emitted by a corresponding light source of the one or more light sources, to the backlight, and wherein the backlight guides the light towards the display panel.

DESCRIPTION OF THE DRAWINGS

FIG. 3 illustrates a mixing distance pertaining to a display configuration;

FIG. 8 is a diagram illustrating exemplary components of the user devices depicted in FIGS. 6 and 7.

DETAILED DESCRIPTION OF PREFERRED EMBODIMENTS

The following detailed description refers to the accompanying drawings. The same reference numbers in different drawings may identify the same or similar elements.

Figure 1A:
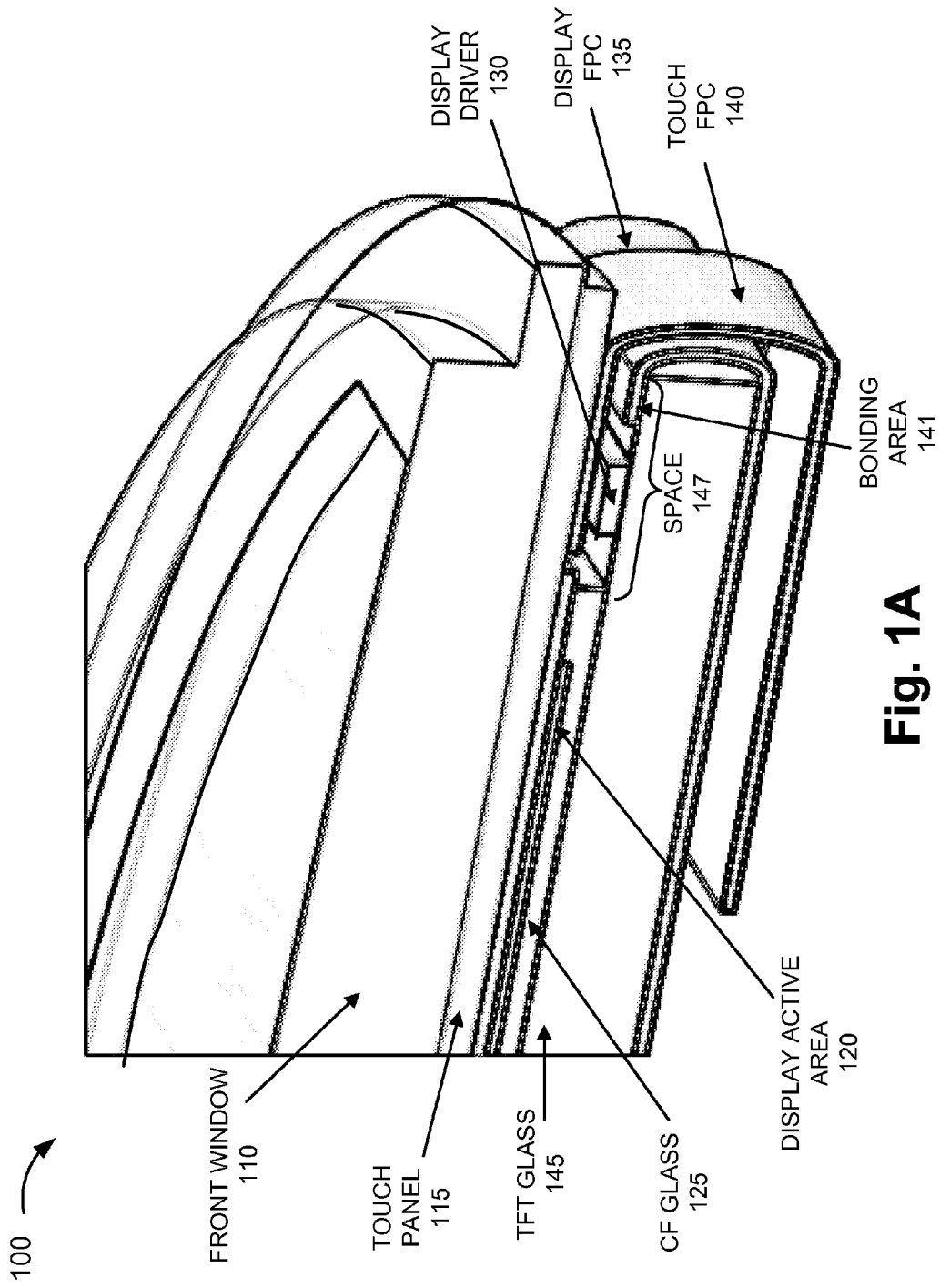
FIG. 1A illustrates a cross-sectional view of an exemplary display configuration of various components of a display.

A configuration for a display, which may or may not be a touch display and/or a touchless display (simply referred to herein as "display"), can limit the possibilities of shape and/or size of certain components of the display. For example, an active area of the display may be restricted in terms of shape and available size in view of the configuration and/or architecture of the display. By way of further example, FIG. 1A illustrates an exemplary display configuration 100 of various components of a display. As illustrated, display configuration 100 comprises a front window 110, a touch panel 115, a display active area 120, a color filter (CF) glass 125, a display driver 130, a display flexible printed circuit (FPC) 135, a touch flexible printed circuit (FPC) 140, a bonding area 141, and a thin-film transistor (TFT) glass 145.

According to display configuration 100, display active area 120 is limited in terms of shape and/or size since a space 147 is needed for display driver 130 and bonding area 141, which bonds display FPC 135 to thin-film transistor (TFT) glass 145. In this way, display signals are routed to a dedicated display driver area. However, as a result of this configuration, the allocated space 147 for these components (e.g., display driver 130, bonding area 141, etc.) prevents display active area 120 extending further towards the edge of thin-film transistor glass 145.

Figure 1B:
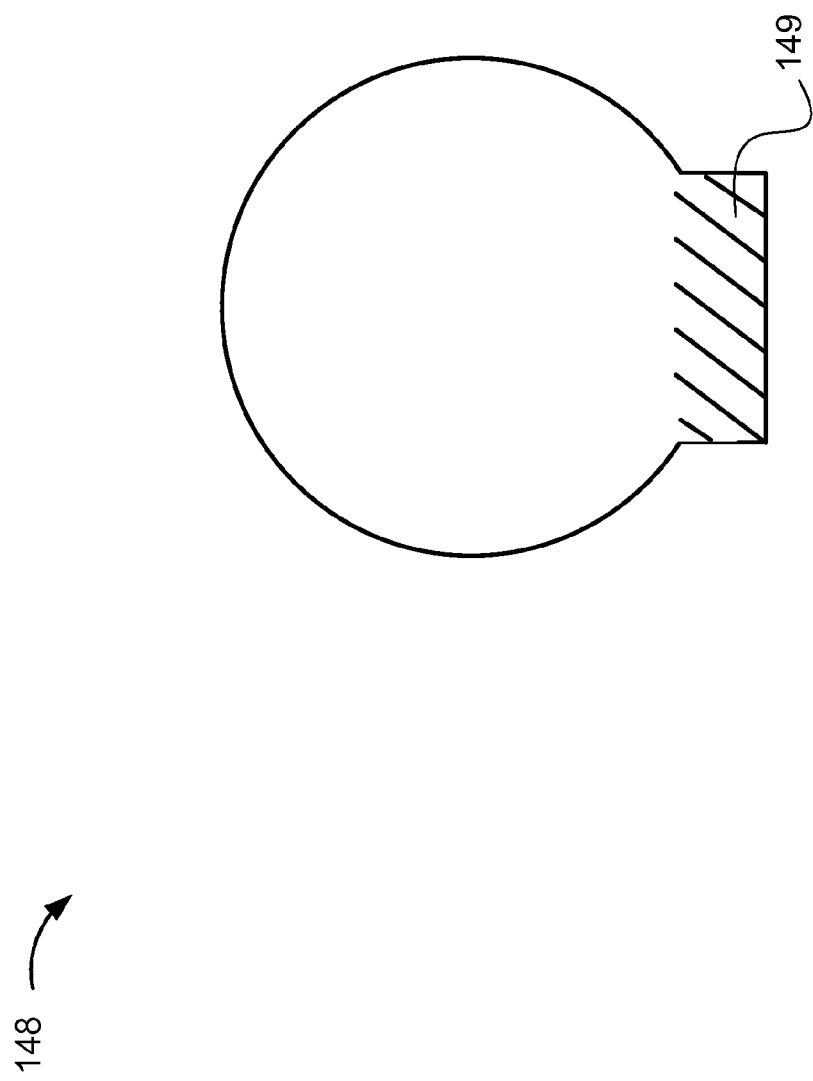
FIGS. 1B through 1D illustrate top-side views of exemplary displays in which display active areas are limited due to display inactive areas.
Figure 1D:
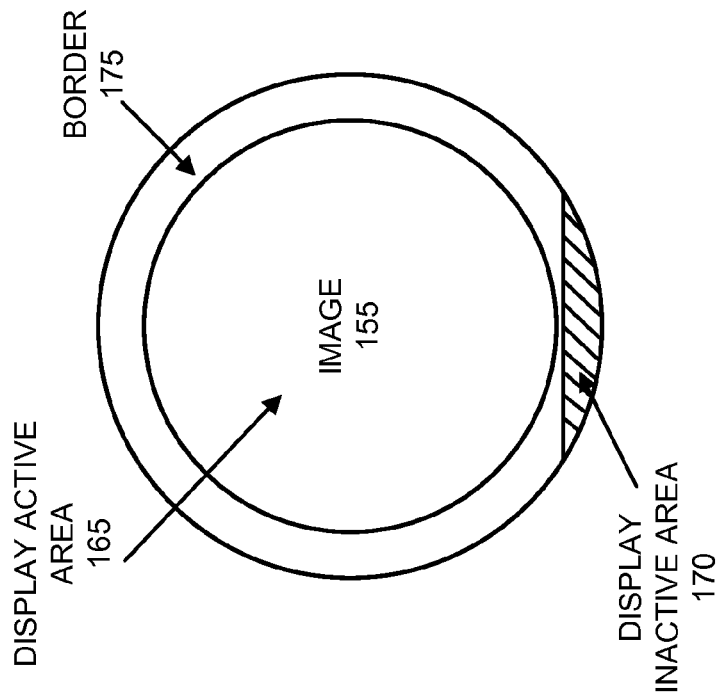
Figure 1C:
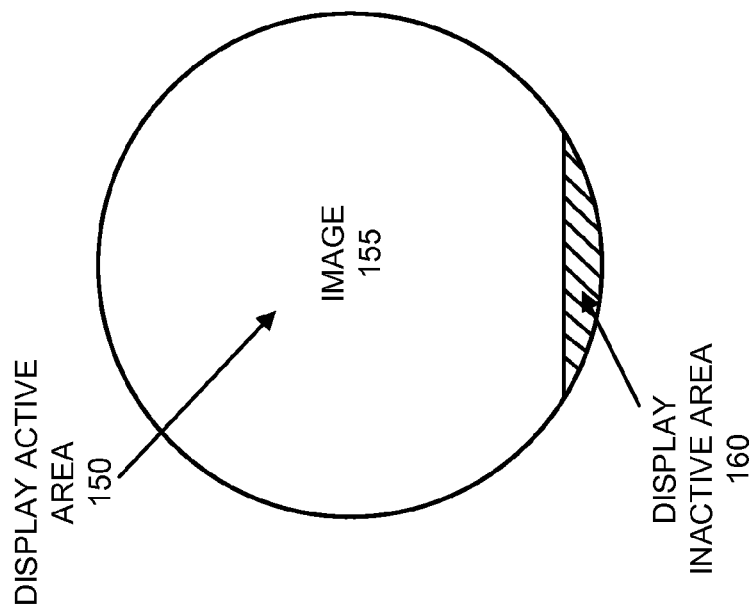

In view of this or similar configuration, which may include a display other than an LCD display, display active area 120 is limited. For example, FIG. 1B illustrates a top-side view of an exemplary display 148 in which an area 149 is designed to place a display driver and a display flexible printed circuit for connection with the display driver (not illustrated). FIG. 1C illustrates a top-side view of an exemplary display. As illustrated, a display active area 150 is limited due to a display inactive area 160 (e.g., where display driver 130, etc. resides). In this regard, an image 155 displayed within display active area 150 has a non-circular active area (sometimes referred to as a "flat tire" problem). Similarly, FIG. 1D illustrates a top-side view of another exemplary display. As illustrated, a display active area 165 is reduced (relative to display active area 150 of FIG. 1C) to allow for a display inactive area 170 (e.g., where display driver 130, etc. resides). In this regard, a border 175 serves as a disguise (from a user's perspective) for display inactive area 170 and provides a (smaller) circular display active area 165.

Figure 2A:
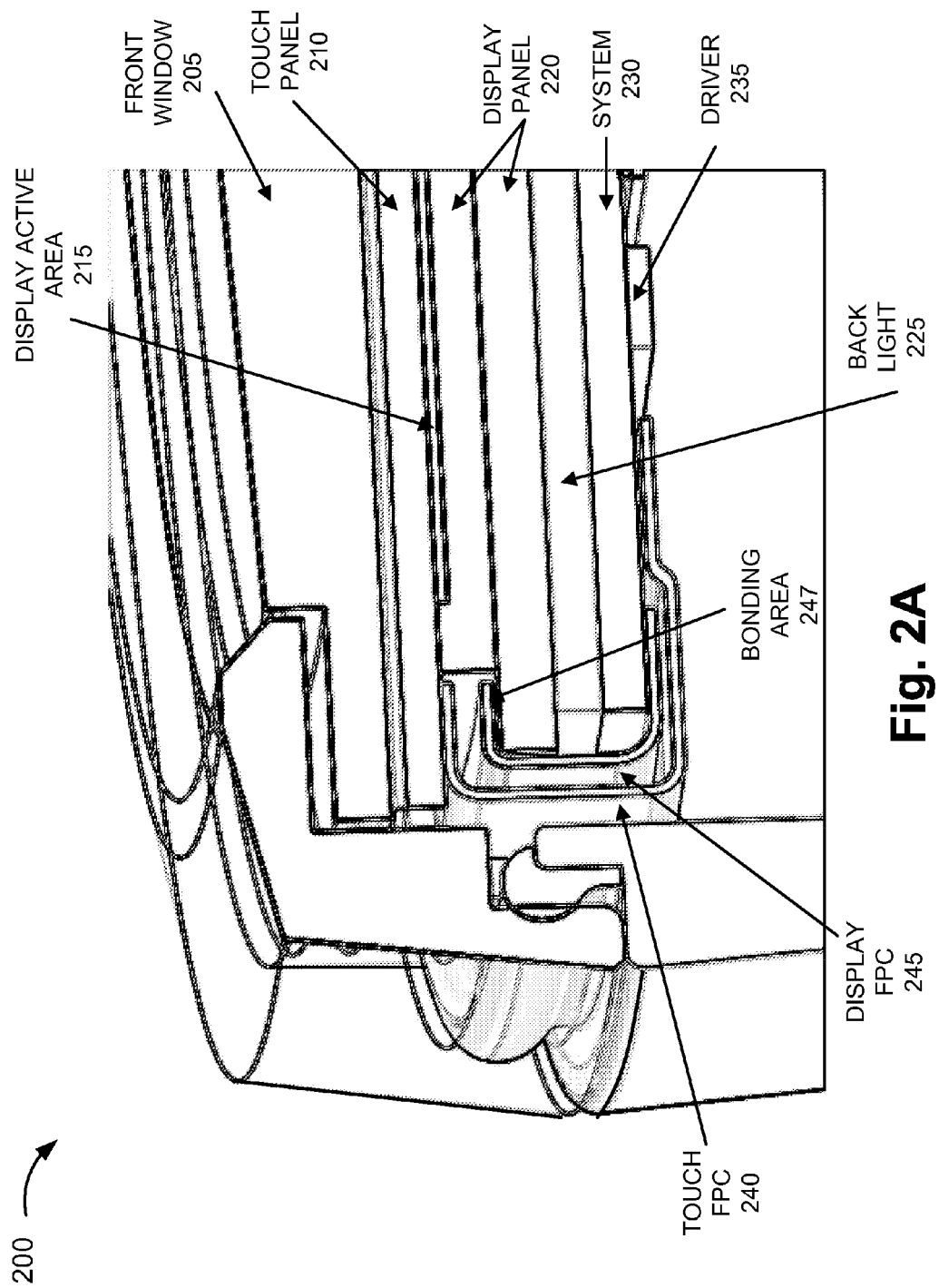
FIG. 2A illustrates a cross-sectional view of another exemplary display configuration in which exemplary embodiments of a display may be implemented.

In view of this issue, display developers are currently investigating ways to provide a "true round" display in which the display active area is round and the border is minimized. One solution has been proposed in U.S. patent application Ser. No. 14/673,955 filed on Mar. 31, 2015, the disclosure of which is hereby incorporated by reference in its entirety. For example, FIG. 2A illustrates a cross-sectional view of a display configuration 200. As illustrated, display configuration 200 of a display comprises a front window 205, a touch panel 210, a display active area 215, a display panel 220, a backlight 225, a system 230, a driver 235, a touch flexible printed circuit (FPC) 240, and a display FPC 245.

As further illustrated, a bonding area 247 connects display FPC 245 to display panel 220. For example, a connection between display panel 220 and display FPC 245 may be implemented by way of heat sealing display FPC 245 to display panel 220 at bonding area 247.

Figure 2B:
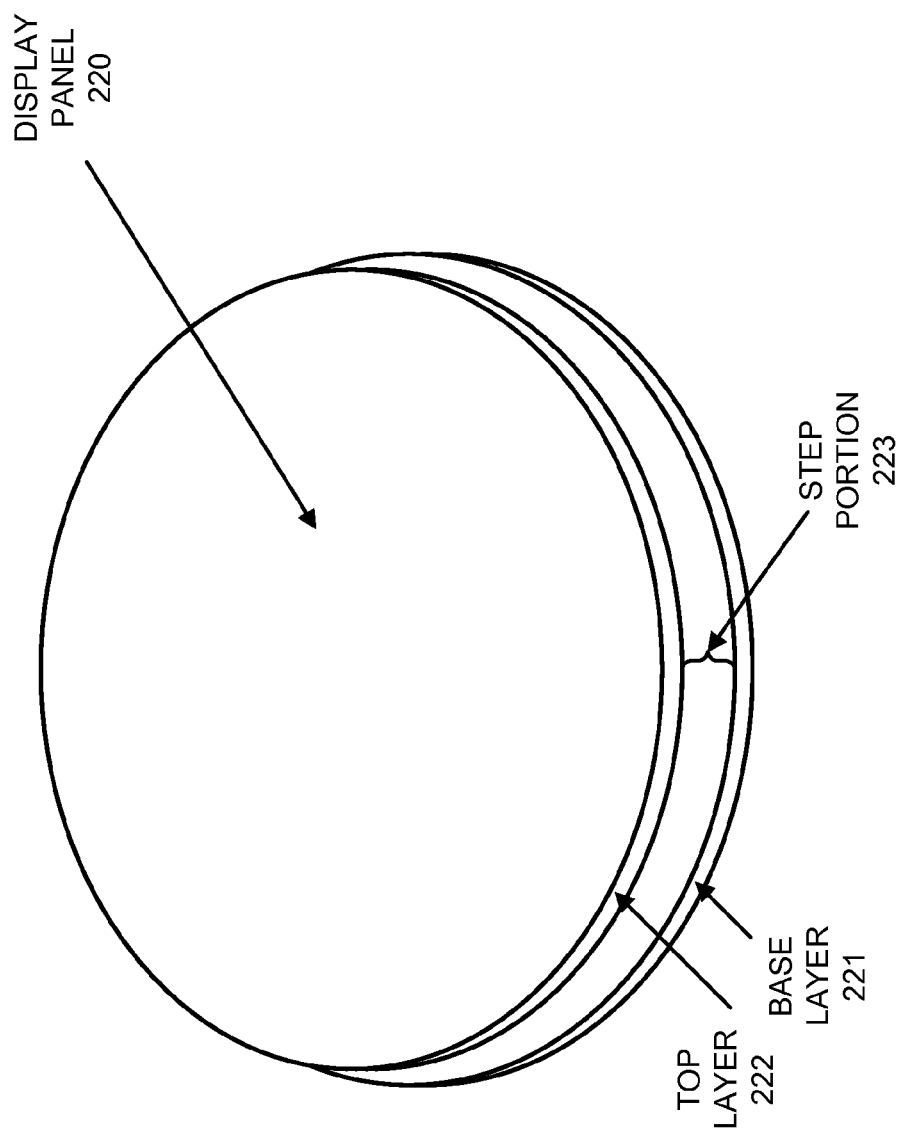
FIG. 2B illustrates an elevational view of an exemplary display.

Referring to FIG. 2B, display panel 220 has a circular configuration comprising a base layer 221 and a top layer 222. For example, when display panel 220 is a liquid crystal display (LCD), base layer 221 may comprise a thin-film transistor (TFT) layer and top layer 222 may comprise a color filter layer. Referring back to FIG. 2A, epoxy glue or other type of adhesive may be added between display FPC 245 and display panel 220 so display FPC 245 is adhered securely. In this way, bonding area 247 provides a connection between display FPC 245 and display panel 220 and permits signals to be routed. Additionally, driver 235 is mounted to the backside or underside of system 230.

System 230 comprises a substrate or a layer of material that allows signals to propagate. For example, multiple flexible connectors may connect to the display panel and system 230. System 230 routes signals to and/or from the multiple flexible connectors to and/or from the driver (e.g., driver 235). Additionally, for example, one or multiple flexible connectors may connect to touch panel 210 and system 230 to route signals to and/or from the one or multiple flexible connectors and to and/or from the driver (e.g., a touch driver). System 230 may be a driver glass (e.g., glass panel, chip-on-glass, etc.), a flexible printed circuit (FPC), a chip-on-flex, a printed circuit board (PCB), or other type of substrate that allows the propagation of signals.

As a result, display active area 215 is less restricted in terms of size and/or shape since driver 235 is not mounted on display panel 220 and multiple display FPCs 245 may be used to route display signals to driver 235.

Figure 2C:
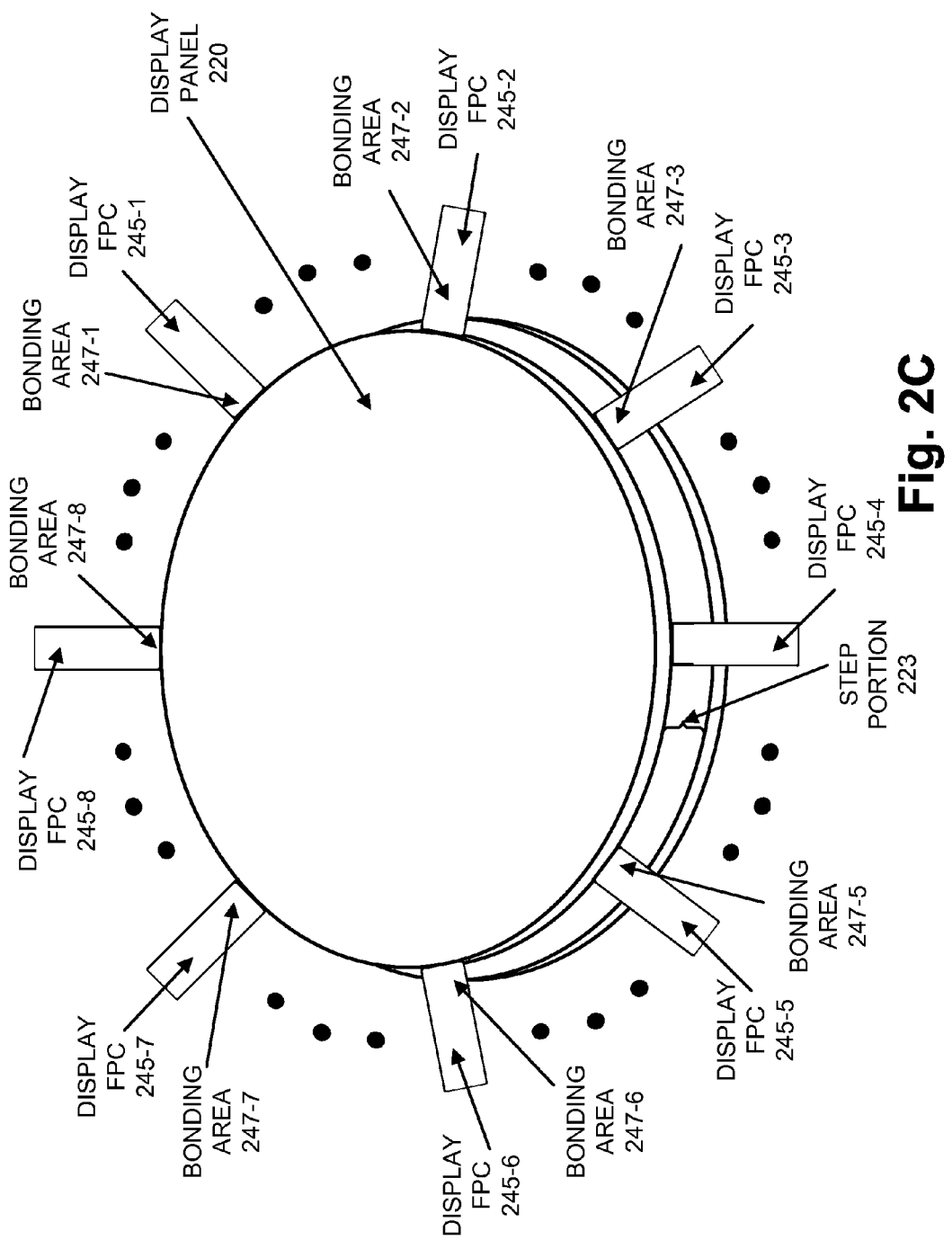
FIGS. 2C and 2D illustrate elevational views of an exemplary display and display flexible printed circuit connection configuration.
Figure 2D:
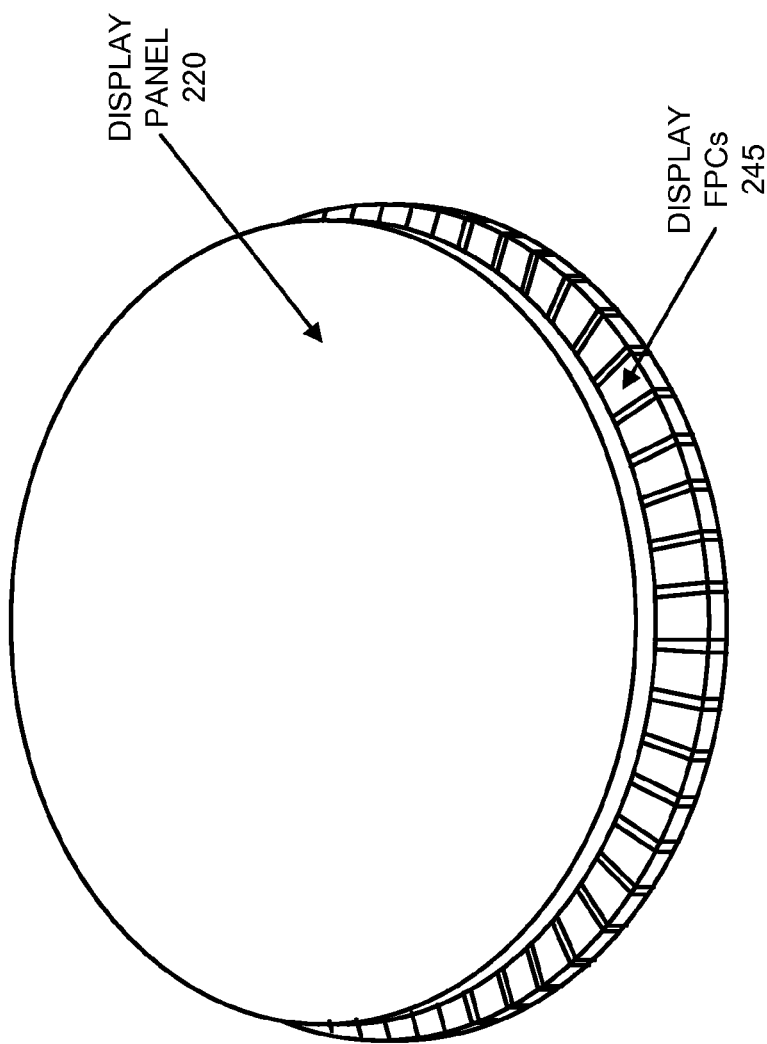

FIGS. 2C and 2D illustrate elevational views of an exemplary configuration of display panel 220 and display FPCs 245 connections. As illustrated, display FPC 245-1 through display FPC 245-8 (also referred to collectively as display FPCs 245 and generally or individually as display FPC 245) connect to display panel 220 at bonding areas 247-1 through 247-8 (also referred to collectively as bonding areas 247 or generally or individually as bonding area 247). The number of display FPCs 245 and bonding areas 247 are exemplary. As indicated by the ellipses in FIG. 2C, the number and/or placement of display FPCs 245 and bonding areas 247 may be greater or fewer, and situated anywhere around the perimeter of top layer 222. According to this configuration, in contrast to the configuration depicted in FIG. 1A in which display driver 130 is located on the display (e.g., a thin-film transistor glass 145), driver 235 is not located on display panel 220.

Referring to FIG. 2D, display FPCs 245 may be folded or wrapped around display panel 220 towards driver 235. Purely for illustrative purposes, the number and placement of display FPCs 245 are different than the number and placement of display FPCs 245 depicted in FIG. 2C.

Figure 2E:
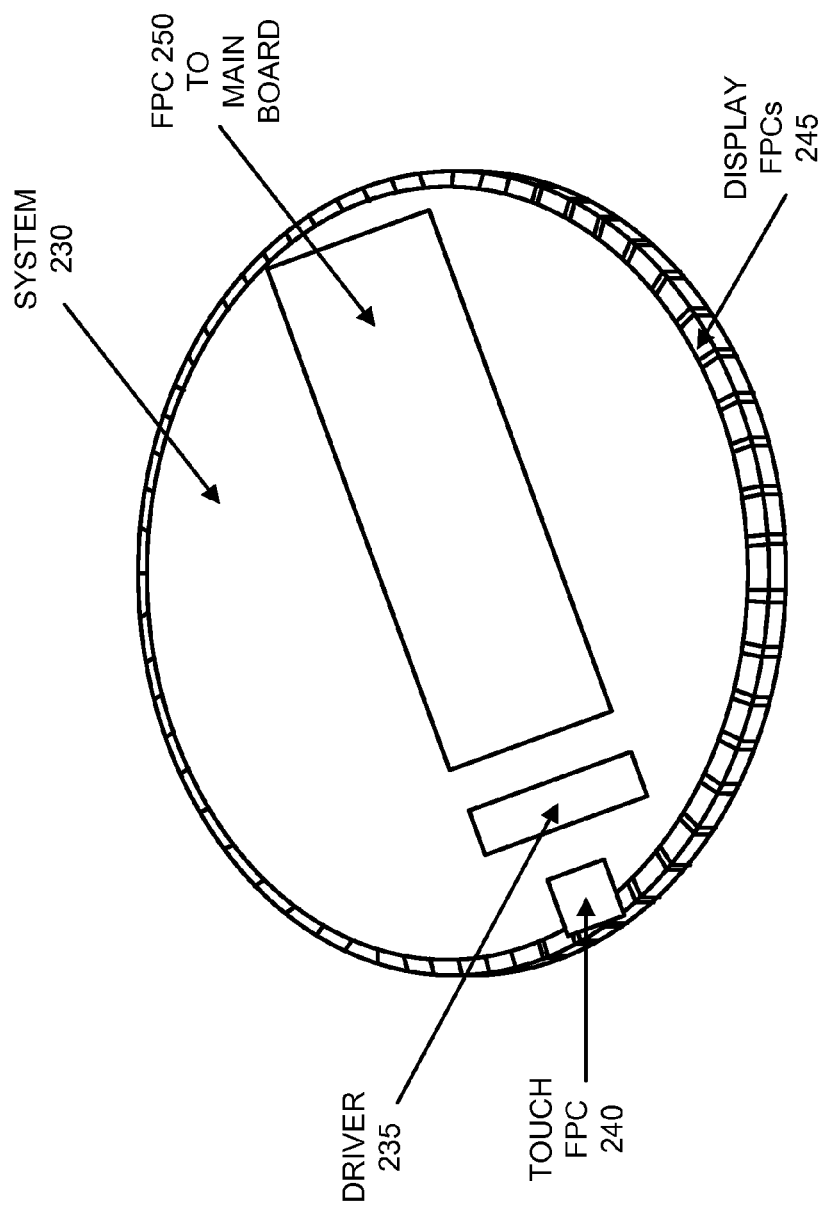
FIG. 2E illustrates a bottom-side view of the display configuration.

FIG. 2E illustrates a bottom-side view of display configuration 200. Referring to FIGS. 2C through 2E, display FPCs 245 connect to system 230. System 230 may be attached (e.g., laminated, etc.) to backlight 225 or a backlight frame (when present—not illustrated) or display panel 220 (e.g., base layer 221) when backlight 225 is omitted (e.g., for display technologies that do not require a backlight). Driver 235 is connected to system 230. Although not illustrated, display FPCs 245 are connected to driver 235. Touch FPC 240 also connects to driver 235. Additionally, a different FPC 250 may connect driver 235 to a main board or a main processing system of a device that comprises display configuration 200.

Figure 2F:
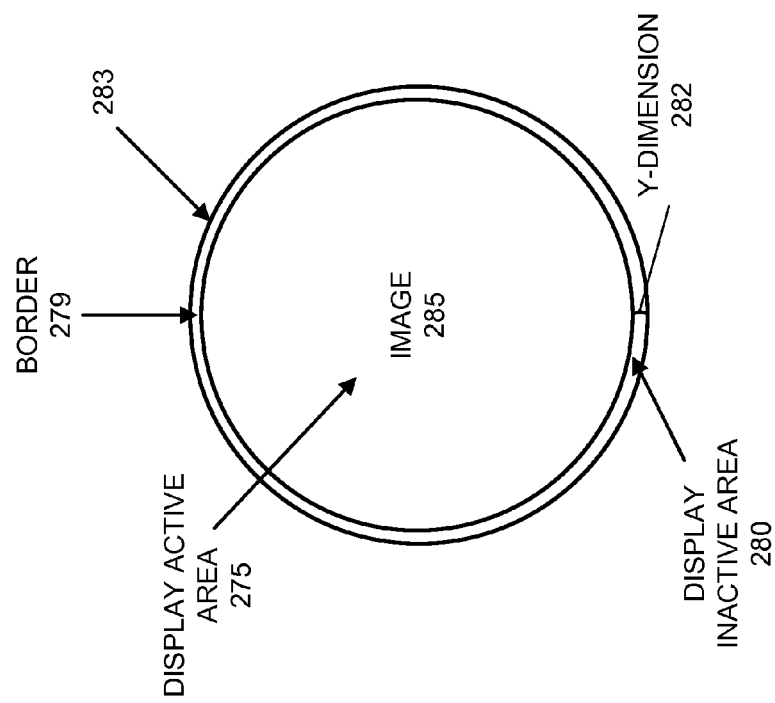
FIG. 2F illustrates a top-side view of a display.

FIG. 2F illustrates a top-side view of the display. As illustrated, relative to FIGS. 1C and 1D, a display active area 275 is less restricted in terms of size and/or shape. For example, a display inactive area 280 (e.g., where display FPCs 245 are connected to display panel 220) can be configured such that a border 279 of the display provides a (larger) circular display active area 275 relative to FIG. 1D. Thus, by virtue of a y-dimension 282 being reduced, an image 285 can be presented via a larger and, in this case circular, display area. By way of example, referring to FIG. 2B, step portion 223 constitutes display inactive area 280. Similarly, as previously illustrated in FIG. 1D, border 279 is analogous to border 175 in which a perimeter 283 constitutes the outer dimension of the display. For round or circular displays, for example, the less wide each display FPC 245 is due to the multiplicity of display FPCs 245 implemented, the smaller border 279 becomes and the larger display active area 275 becomes. Display configuration 200 may be implemented to provide displays having various shapes, other than circular, and may increase the display active area of the displays being used relative to any display inactive area.

Unfortunately, with a display, such as a round or other shaped display, there is a problem with how to yield uniform backlighting when borders are too small. According to some implementations, a light guide is situated in a frame and light-emitting diodes (LEDs) are placed at one or multiple sides of the light guide so as to emit light into the light guide. In order to avoid poor uniformity or "hot spots" on the light guide, the LED light needs a mixing distance before entering the viewing area of the display. For example, referring to FIG. 3, arrow 305 represents an exemplary LED mixing distance of a display having a configuration analogous to that previously described in relation to FIG. 1B, which includes an LED 300.

With a display that has a very slim border, such as a display of display configuration 200, there may not be sufficient space to place a light source (e.g., an LED) and a light guide in a display frame that yield a sufficient mixing distance to avoid hot spots and/or uneven backlight uniformity. Alternatively, other types of display configurations, such as illustrated in FIG. 3, may not afford enough space to provide a sufficient mixing distance to avoid hot spots and/or uneven backlight uniformity. While certain display technologies may not suffer from this problem, such as an OLED display, which does not use a light guide, other display technology configurations (e.g., an LCD configuration) remain confronted with this issue.

Figure 4A:
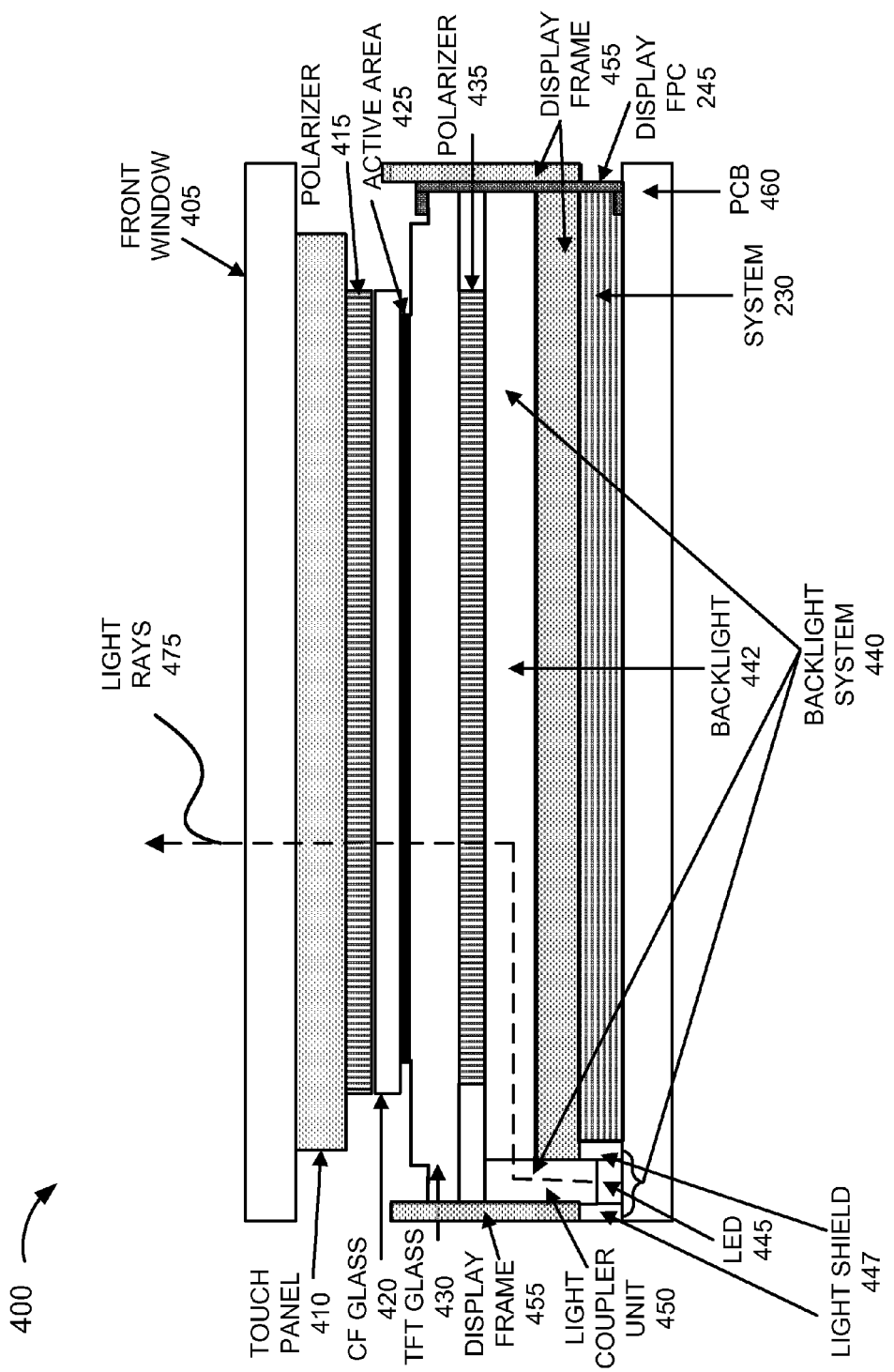
FIG. 4A illustrates an exemplary display configuration that comprises an exemplary embodiment of a divided backlight configuration.

FIG. 4A illustrates an exemplary display configuration 400 that includes an exemplary embodiment of a divided backlight configuration. As illustrated, display configuration 400 comprises a front window 405, a touch panel 410, a polarizer 415, a color filter glass 420, a display active area 425, a TFT glass 430, a polarizer 435, and a backlight system 440 comprising a backlight 442, an LED 445, a light shield 447, and a light coupler unit 450. Display configuration 400 further comprises a display frame 455, display FPC 245, system 230, and a printed circuit board (PCB) 460.

According to other embodiments, display configuration 400 may include additional components or layers, fewer components or layers, different components or layers, and/or a different arrangement of components or layers. For example, according to another embodiment, display configuration 400 may not include touch panel 210.

Front window 405 comprises a transparent layer of display configuration 400 through which a user may see visual elements (e.g., graphics, etc.) that are displayed. In addition to being a clear layer, front window 405 may act as a protective covering. For example, front window 405 may be oil resistant (e.g., oil on a human's finger), scratch or abrasion resistant, etc. Front window 405 may be implemented as a film or coating. For example, front window 405 may be implemented as tempered glass or a plastic layer.

Touch panel 410 comprises a device that senses the touch of a user and/or an instrument (e.g., a stylus, gloved touch, etc.). Touch panel 410 may use one or multiple sensing technologies, such as, for example, capacitive sensing (e.g., resistive, projected, etc.), surface acoustic wave (SAW) sensing, resistive sensing, optical sensing, pressure sensing, infrared sensing, acoustic sensing, and/or gesture sensing. Touch panel 410 may detect a single-point input, a multi-point input, etc. Additionally, or alternatively, touch panel 410 comprises a device that senses air-touch and air-gestures of the user and/or an instrument. In this regard, touch panel 410 may be operable in an on-touch and/or touchless mode.

Polarizer 415 and polarizer 435 comprise polarizing films or sheets that improve color and definition of the display. Polarizer 415 and polarizer 435 have various polarizing properties (e.g., efficiency, axis, wavelength, etc.). CF glass 420 comprises a layer to enable color display on an LCD panel. For example, CF glass 420 may comprise a glass substrate and a color pattern (e.g., a three, a four, etc., color resist) formed into a pattern by a black matrix. Display active area 425 comprises a portion of the total display area occupied by pixels.

TFT glass 430 comprises a glass substrate and TFTs that form a matrix of pixels. There are a variety of LCD panel technologies that may be implemented in display configuration 400.

Backlight system 440 comprises a device that provides light to allow the LCD (e.g., TFT glass 430, etc.) to produce a visible image. According to an exemplary embodiment, backlight system 440 comprises a divided configuration. According to an exemplary embodiment, the backlight system 440 comprises LED 445, light shield 447, light coupler unit 450, and backlight 442. According to an exemplary embodiment, PCB 460 hosts and is directly connected to LED 445. Light shield 447 is also placed on PCB 460. LED 445 comprises a light-emitting diode and serves as a light source. According to an exemplary implementation, LED 445 is a top-firing LED (e.g., emits light from a top of the LED via a window). According to another exemplary implementation, LED 445 is a side-firing LED. LED 445 may be a single color or a multicolor LED. According to an exemplary implementation, LED 445 is external to light coupler unit 450. According to such an implementation, light shield 447 is placed next to and surrounds LED 445 to prevent light leakage and to direct light towards light coupler unit 450. According to another exemplary implementation, LED 445 is encased in light coupler unit 450. According to such an implementation, light shield 447 may be omitted.

Light coupler unit 450 comprises a device to direct and distribute light from LED 445 to backlight 442. According to an exemplary embodiment, light coupler unit 450 comprises an LED-to-light guide interface, a light guide, and a light guide-to-backlight 442 interface. As illustrated, light coupler unit 450 directs light rays 475 from LED 445 to backlight 442. For example, the light guide comprises an architecture that provides for right angle light guidance. By way of further example, the light guide may comprise a 45 degree prism reflector or a light guide with a 90 degree bend.

Backlight 442 comprises a backlight assembly. Backlight 442 comprises a backlight-to-light guide interface. Backlight 442 comprises an architecture that receives light from LED 445 via light coupler unit 450 and directs the light toward TFT glass 430, CF glass 420, etc. For example, backlight 442 comprises a main light guide and couplers to direct the light. According to an exemplary implementation, backlight 442 does not include a light source. As illustrated, Based on the backlight system 440 configuration, by virtue of creating more distance from LED 445 to the viewing area of the LCD display, a larger mixing distance for the light in the light guide is provided before the light enters the viewing area of the display. Additionally, light coupler unit 450 also diffuses the light, which may decrease the risk of hotspots and/or uneven backlight uniformity. For example, in a conventional backlight system, where an LED is directly coupled into the light guide, the light from the LED is more or less a point source. The light guide needs to spread the light significantly over a short distance in order to avoid hotspots or non-uniformity. According to an exemplary embodiment, light coupler unit 450 can assist in spreading the light and the LED light mixing distance can be reduced. Additionally, if the light mixing unit is physically smaller in the y-dimension (compared to LED 445), the dead space (e.g., display over all border) for the display can further be reduced.

Display frame 455 comprises a housing that supports various components of display configuration 400. PCB 460 comprises a printed circuit board. PCB 460 may be a printed circuit board for the LCD or a main printed circuit board for a user device that includes the LCD. Alternatively, PCB 460 may be a flexible printed circuit or a flex foil. In this regard, PCB 460 and "printed circuit board" is intended to be broadly interpreted. As illustrated, LED 445 and light shield 447 reside on PCB 460. LED 445 may be directly connected to PCB 460 and driven by logic residing on PCB 460. Depending on the implementation, PCB 460 may include other components not illustrated, such as a main processor, a memory, software, etc. By way of further example, PCB 460 may comprise components illustrated in FIG. 8 and/or may pertain to a user device, as described below.

System 230 and display FPC 245 have been previously described. According to an exemplary embodiment, display configuration 400 comprises display configuration 200, as previously described. System 230 may connect to PCB 460. For example, referring back to FIG. 2E, FPC 250 may connect system 230 to PCB 460. By way of example, as previously described, PCB 460 may be a main printed circuit board of a user device. PCB 460 may include various components illustrated in FIG. 8, as described below. For example, PCB 460 may include a processor, a memory, a communication interface, etc.

Figure 4B:
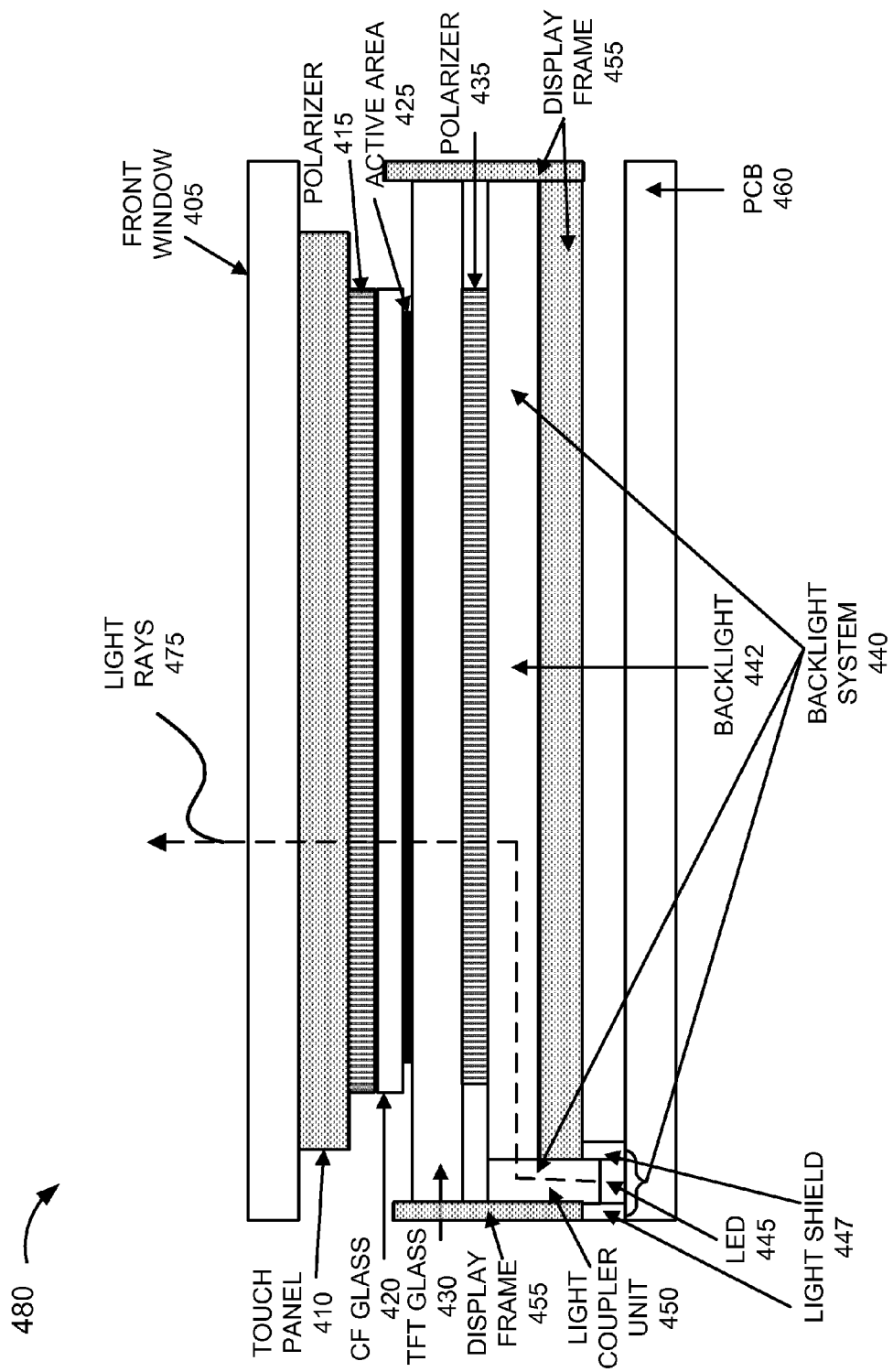
FIG. 4B illustrates another exemplary display configuration that comprises another exemplary embodiment of a divided backlight configuration.

FIG. 4B illustrates an exemplary display configuration 480 that includes an exemplary embodiment of a divided backlight configuration. In contrast to display configuration 400, display configuration 480 does not comprise system 230. For example, display configuration 480 does not comprise display configuration 200. Although not illustrated, a touch driver and a display driver may be implemented in a manner similar to that described in relation to FIG. 1A.

Figure 5:
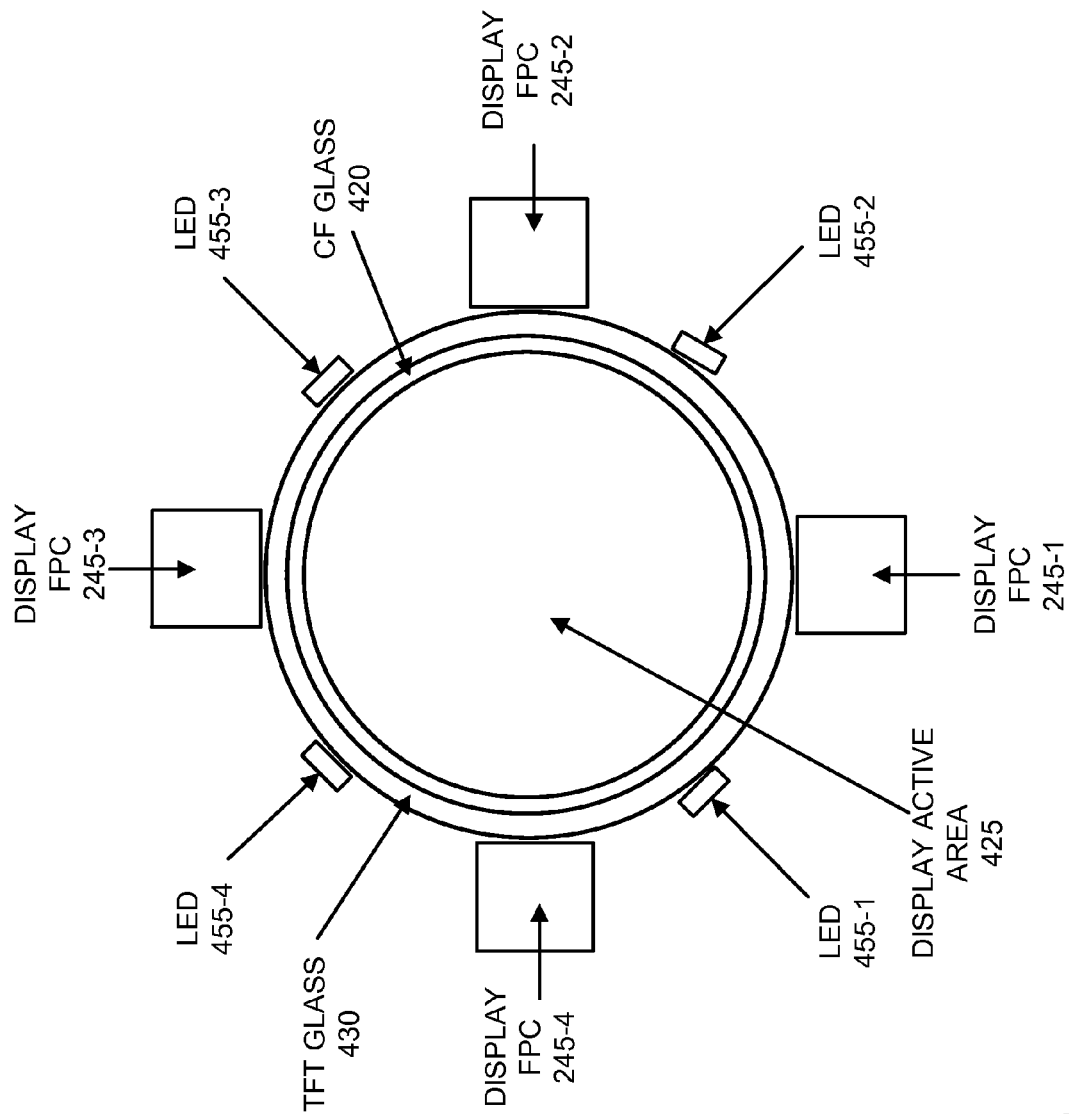
FIG. 5 illustrates a top-side view of a display comprising the embodiment of the divided backlight configuration of FIG. 4A.

FIG. 5 illustrates a top-side view of a display comprising display configuration 400. As illustrated, display FPCs 245-1 through 245-4 (display FPCs 245) are situated around TFT glass 430 in a manner previously described in relation to display configuration 200. For example, display FPCs 245 are folded and connected to system 230. Additionally, LEDs 445-1 through 445-4 (LEDs 445) are situated on PCB 460 (not illustrated) around also situated around TFT glass 430. Additionally, for the sake of simplicity, although not illustrated, with each LED 445, there is light coupling unit 450 and light shield 447, as previously described. The number and placement of display FPCs 245 and LEDs 445 are merely exemplary.

Figure 6:
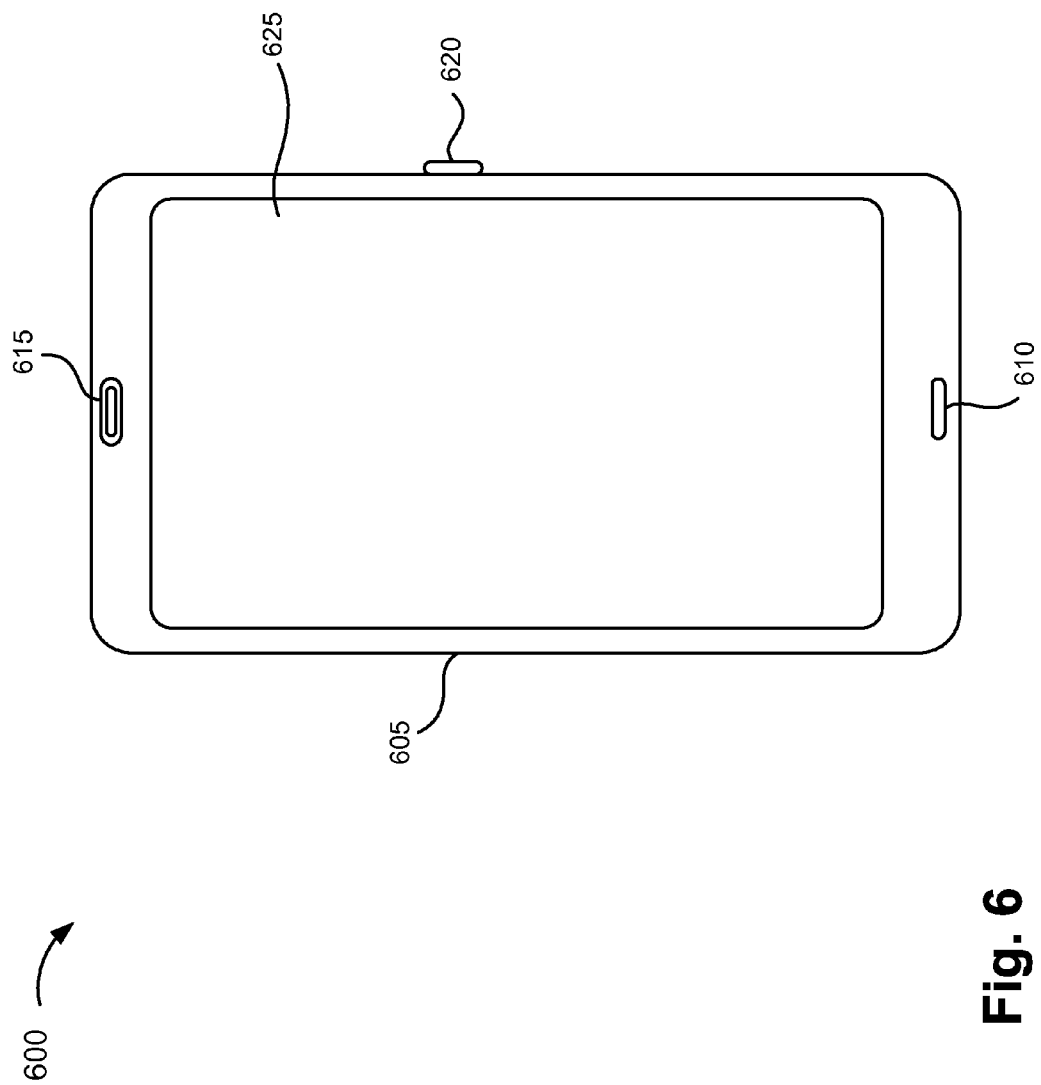
FIG. 6 illustrates an exemplary user device in which an embodiment of the divided backlight configuration may be implemented.

Display configuration 400 and 480 may be implemented within various types of user devices. FIG. 6 illustrates an exemplary user device 600 in which an embodiment of the divided backlight configuration may be implemented. While illustratively speaking based on FIG. 6, user device 600 may be representative of, for example, a smartphone, a cellphone, or a personal digital assistant (PDA), user device 600 may be implemented as various other types of user devices. For example, user device 600 may take the form of a tablet device, a data organizer, a picture capturing device, a video capturing device, a Web-access device, a computer, a palmtop device, a netbook, a gaming device, a location-aware device, a music playing device, a television, or some other type of consumer device that comprises a display. Alternatively, user device 600 may be implemented as a non-consumer device, a non-mobile device, or any other form of an electronic device. As illustrated in FIG. 6, user device 600 comprises a housing 605, a microphone 610, a speaker 615, a button 620, and a display 625. Display 625 may be implemented based on display configuration 400 or 480, as described herein. According to other embodiments, user device 600 may comprise fewer components, additional components, different components, and/or a different arrangement of components than those illustrated in FIG. 6 and described herein.

Figure 7:
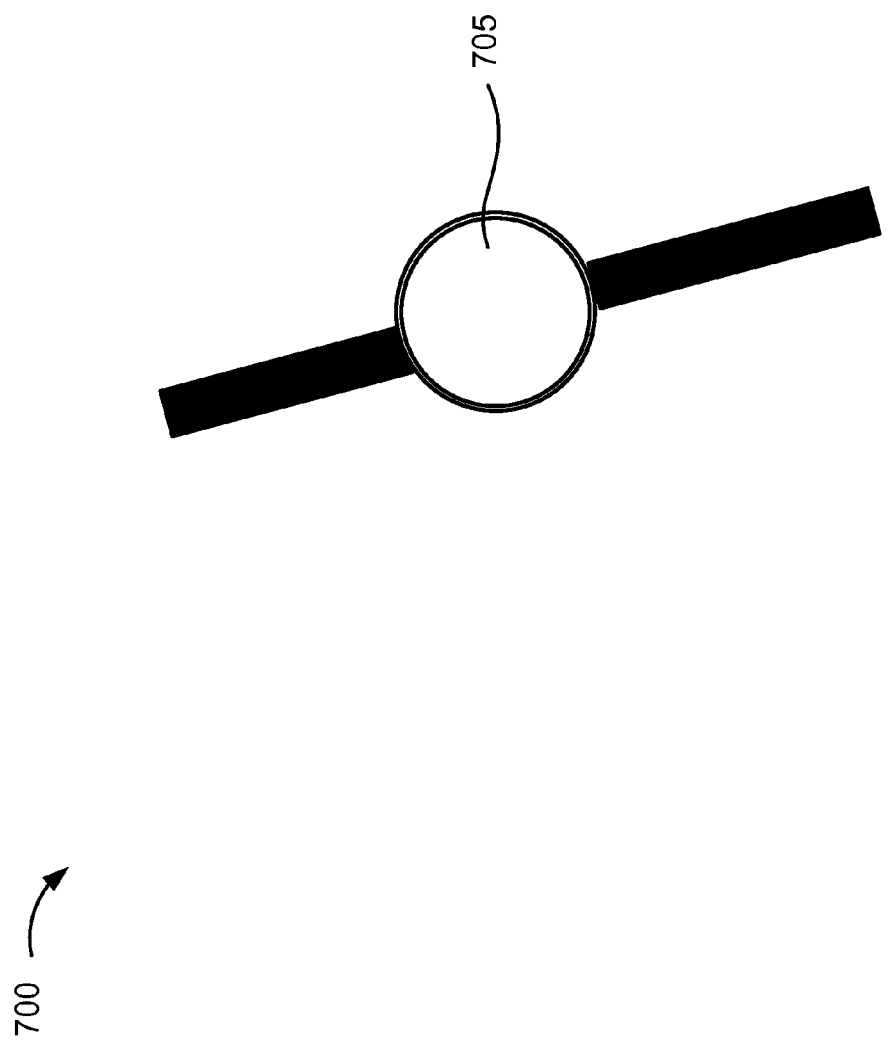
FIG. 7 illustrates another exemplary user device in which an embodiment of the divided backlight configuration may be implemented.

FIG. 7 illustrates another example of a user device 700 in which an embodiment of the divided backlight may be implemented. In this example, user device 700 is representative of a wearable device (e.g., a watch-type user device) that comprises a circular display 705. Circular display 705 may be implemented based on display configuration 400 or 480, as described herein.

FIG. 8 illustrates exemplary components of user devices 600 and 700 (simply referred to as user device 600). As illustrated, according to an exemplary embodiment, user device 600 comprises a processor 805, memory/storage 810, software 815, a communication interface 820, an input 825, and an output 830. According to other embodiments, user device 600 may comprise fewer components, additional components, different components, and/or a different arrangement of components than those illustrated in FIG. 8 and described herein.

Processor 805 comprises one or multiple processors, microprocessors, data processors, co-processors, and/or some other type of component that interprets and/or executes instructions and/or data. Processor 805 may be implemented as hardware (e.g., a microprocessor, etc.) or a combination of hardware and software (e.g., a system-on-chip (SoC), an application-specific integrated circuit (ASIC), etc.). Processor 805 performs one or multiple operations based on an operating system and/or various applications or programs (e.g., software 815).

Memory/storage 810 comprises one or multiple memories and/or one or multiple other types of storage mediums. For example, memory/storage 810 may include a random access memory (RAM), a dynamic random access memory (DRAM), a cache, a read only memory (ROM), a programmable read only memory (PROM), and/or some other type of memory. Memory/storage 810 may include a hard disk (e.g., a magnetic disk, an optical disk, a magneto-optic disk, a solid state disk, etc.).

Software 815 comprises an application or a program that provides a function and/or a process. Software 815 may include firmware. By way of example, software 815 may comprise a telephone application, a multi-media application, an e-mail application, a contacts application, a calendar application, an instant messaging application, a web browsing application, a location-based application (e.g., a Global Positioning System (GPS)-based application, etc.), a camera application, etc. Software 815 comprises an operating system (OS). For example, depending on the implementation of user device 600, the operating system may correspond to iOS, Android, Windows Phone, Symbian, or another type of operating system (e.g., proprietary, BlackBerry OS, Windows, Linux, etc.).

Communication interface 820 permits user device 600 to communicate with other devices, networks, systems, etc. Communication interface 820 may include one or multiple wireless interfaces and/or wired interfaces. Communication interface 820 may include one or multiple transmitters, receivers, and/or transceivers. Communication interface 820 operates according to one or multiple protocols, a communication standard, and/or the like.

Input 825 permits an input into user device 600. For example, input 825 may include a button, a switch, a touch pad, an input port, speech recognition logic, and/or a display (e.g., a touch display, a touchless display). Output 830 permits an output from user device 600. For example, output 830 may include a speaker, a display, a light, an output port, and/or some other type of output component.

User device 600 may perform a process and/or a function in response to processor 805 executing software 815 stored by memory/storage 810. By way of example, instructions may be read into memory/storage 810 from another memory/storage 810 or read into memory/storage 810 from another device via communication interface 820. The instructions stored by memory/storage 810 causes processor 805 to perform the process or the function. Alternatively, user device 600 may perform a process or a function based on the operation of hardware (processor 805, etc.).

The foregoing description of embodiments provides illustration, but is not intended to be exhaustive or to limit the embodiments to the precise form disclosed. Accordingly, modifications to the embodiments described herein may be possible.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

The terms "comprise," "comprises" or "comprising," as well as synonyms thereof (e.g., include, etc.), when used in the specification is meant to specify the presence of stated features, integers, steps, or components but does not preclude the presence or addition of one or more other features, integers, steps, components, or groups thereof. In other words, these terms are to be interpreted as inclusion without limitation.

The word "exemplary" is used herein to mean "serving as an example." Any embodiment or implementation described as "exemplary" is not necessarily to be construed as preferred or advantageous over other embodiments or implementations.

Spatially relative terms, such as "beneath," "below," "lower," "above," "upper," and the like, may be used herein for ease of description to describe one element's or feature's relationship to another element or feature as illustrated in the figures. For example, if the element in the figure is turned over, an element described as "below" or "beneath" another element or another feature would then be oriented "above" the other element or the other feature. Thus, for example, the exemplary terms "below" or "beneath" may encompass both an orientation of above and below depending on the orientation of a display device or a user device. In the instance that the display device may be oriented in a different manner (e.g., rotated at 90 degrees or at some other orientation), the spatially relative terms used herein should be interpreted accordingly.

In the preceding specification, various embodiments have been described with reference to the accompanying drawings. However, various modifications and changes may be made thereto, and additional embodiments may be implemented, without departing from the broader scope of the invention as set forth in the claims that follow. The specification and drawings are accordingly to be regarded as illustrative rather than restrictive.

In the specification and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

No element, act, or instruction described in the present application should be construed as critical or essential to the embodiments described herein unless explicitly described as such.

Use of ordinal terms such as "first," "second," "third," etc., in the claims to modify a claim element does not by itself connote any priority, precedence, or order of one claim element over another, but are used merely as labels to distinguish one claim element having a certain name from another element having a same name (but for use of the ordinal term) to distinguish the claim elements.

What is claimed is:

1. A device comprising:
   a display panel, wherein the display panel comprises two or more bonding areas;
   a driver configured to drive the display panel;
   a layer, wherein the driver is mounted to the layer and signals to and from the driver are propagated by conductive elements of the layer;
   two or more flexible connectors, wherein the two or more flexible connectors provide communication paths between the display panel and the driver, and wherein a first end of each of the two or more flexible connectors connects to the display panel at a corresponding one of the two or more bonding areas, and wherein a second end of each of the two or more flexible connectors connects to the driver via the layer;
   a backlight, wherein the backlight is located between the display panel and the layer;
   one or more light sources;
   one or more light coupling units, wherein each light coupling unit is configured to guide light, when emitted by a corresponding light source of the one or more light sources, to the backlight; and
   a printed circuit board, wherein the one or more light sources are directly connected to the printed circuit board, and the layer and the backlight are between the printed circuit board and the display panel; and
   wherein the display panel, the layer, the backlight and the printed circuit board are in stacked relationship and through each of which a longitudinal axis of the device traverses;
   wherein the flexible connectors extend in a direction of the longitudinal axis adjacent a radial periphery of the backlight; and
   wherein the light coupling units each guide light in the direction of the longitudinal axis adjacent a radial periphery of the layer.

2. The device of claim 1, further comprising:
   a light shield for each light source of the one or more light sources, and wherein each of the two or more flexible connectors comprises one of a flexible printed circuit, a chip-on-flex, or a chip-on-foil.

3. The device of claim 1, wherein each of the one or more light coupling units comprises a right-angle light coupling unit that redirects light traveling in the direction of the longitudinal axis to travel within the backlight in a direction of a major plane of the backlight, and each of the two or more flexible connectors comprises one of a flexible printed circuit, a chip-on-flex, or a chip-on-foil.

4. The device of claim 1, wherein the one or more light sources comprise two or more light-emitting diodes.

5. The device of claim 4, further comprising:
a touch panel operable in at least one of an on-touch mode or a touchless mode; and
a touch flexible connector, wherein the touch flexible connector connects the touch panel to the driver via the layer, wherein the touch flexible connector travels in a direction of the longitudinal axis adjacent a radial periphery of the backlight, and the driver is further configured to drive the touch panel, and the two or more light-emitting diodes are top firing and emit light in the direction of the longitudinal axis.

6. The device of claim 1, wherein the backlight does not comprise a light source.

7. The device of claim 1, wherein the layer is one of a chip-on-flex, a printed circuit board, a chip-on-glass, a glass panel, or a flexible printed circuit, and the display panel comprises a liquid crystal display.

8. A user device comprising:
a display comprising:
a display panel, wherein the display panel comprises two or more bonding areas;
a driver configured to drive the display panel;
a layer, wherein the driver is mounted to the layer and signals to and from the driver are propagated by conductive elements of the layer;
two or more flexible connectors, wherein the two or more flexible connectors provide communication paths between the display panel and the driver, and wherein a first end of each of the two or more flexible connectors connects to the display panel at a corresponding one of the two or more bonding areas, and wherein a second end of each of the two or more flexible connectors connects to the driver via the layer;
a backlight, wherein the backlight is located between the display panel and the layer;
one or more light sources;
one or more light coupling units, wherein each light coupling unit is configured to guide light, when emitted by a corresponding light source of the one or more light sources, to the backlight;
a printed circuit board, wherein the one or more light sources are directly connected to the printed circuit board, and the layer and the backlight are between the printed circuit board and the display panel; and
wherein the display panel, the layer, the backlight and the printed circuit board are in stacked relationship and through each of which a longitudinal axis of the device traverses;
wherein the flexible connectors extend in a direction of the longitudinal axis adjacent a radial periphery of the backlight;
wherein the light coupling units each guide light in the direction of the longitudinal axis adjacent a radial periphery of the layer; and
a memory, wherein the memory stores software; and
a processor, wherein the processor is configured to execute the software.

9. The user device of claim 8, further comprising:
a light shield for each light source of the one or more light sources, and wherein each of the two or more flexible connectors comprises one of a flexible printed circuit, a chip-on-flex, or a chip-on-foil.

10. The user device of claim 8, wherein each of the one or more light coupling units comprises a right-angle light coupling unit that redirects light traveling in the direction of the longitudinal axis to travel within the backlight in a direction of a major plane of the backlight, and each of the two or more flexible connectors comprises one of a flexible printed circuit, a chip-on-flex, or a chip-on-foil.

11. The user device of claim 10, further comprising:
a touch panel operable in at least one of an on-touch mode or a touchless mode; and
a touch flexible connector, wherein the touch flexible connector connects the touch panel to the driver via the layer, wherein the touch flexible connector travels in a direction of the longitudinal axis adjacent a radial periphery of the backlight, and
wherein the driver is further configured to drive the touch panel, and the one or more light sources comprise one or more top firing light-emitting diodes that emit light in the direction of the longitudinal axis.

12. The user device of claim 8, wherein the layer is one of a chip-on-flex, a printed circuit board, a chip-on-glass, a glass panel, or a flexible printed circuit, and the display panel comprises a liquid crystal display.

13. The user device of claim 8, wherein the display panel comprises:
a thin-film transistor layer; and
a color filter layer, and wherein the two or more bonding areas are located on the thin-film transistor layer, and wherein the thin-film transistor layer and the color filter layer have a circular configuration.

14. The user device of claim 8, wherein the backlight does not comprise a light source.

15. The user device of claim 8, wherein the user device is a wearable device or a mobile device.

16. A device comprising:
a display panel;
a backlight;
a printed circuit board, wherein the backlight is between the display panel and the printed circuit board;
one or more light sources, wherein the one or more light sources are directly connected to the printed circuit board; and
one or more light coupling units, wherein each light coupling unit is configured to guide light, when emitted by a corresponding light source of the one or more light sources, to the backlight, and wherein the backlight guides the light in a direction of a major plane of the backlight and emits the light towards the display panel; and
wherein the display panel, the backlight and the printed circuit board are in stacked relationship and through each of which a longitudinal axis of the device traverses; and
wherein the light coupling units each guide light in the direction of the longitudinal axis and, at an end of the light coupling unit distal the respective light source, redirect light traveling in the direction of the longitudinal axis to travel within the backlight in the direction of the major plane of the backlight.

17. The device of claim 16, further comprising:
a light shield for each light source of the one or more light sources.

18. The device of claim 16, wherein the one or more light sources comprise two or more light-emitting diodes and the two or more light-emitting diodes are top firing and emit light in the direction of the longitudinal axis into an end of the light coupling unit proximal the respective light source.

19. The device of claim 1, wherein the flexible connectors further extend in the direction of the longitudinal axis adjacent a radial periphery of a thin-film transistor layer of the display panel.

20. The user device of claim 8, wherein the flexible connectors further extend in the direction of the longitudinal axis adjacent a radial periphery of a thin-film transistor layer of the display panel.

* * * * *